United States Patent

[11] 3,553,422

| [72] | Inventor | George H. McCoy |
| | | Allentown, Pa. |
| [21] | Appl. No. | 819,727 |
| [22] | Filed | Apr. 28, 1969 |
| [45] | Patented | Jan. 5, 1971 |
| [73] | Assignee | Air Products and Chemicals, Inc. |
| | | Allentown, Pa. |
| | | a corporation of Delaware |

[54] PLASMA ARC WELDING METHOD AND APPARATUS
3 Claims, 3 Drawing Figs.

| [52] | U.S. Cl. | 219/121 |
| [51] | Int. Cl. | B23k 9/00 |
| [50] | Field of Search | 219/74, 75, 121, 121P, 130, 137, 76 |

[56] References Cited
UNITED STATES PATENTS

| 3,272,959 | 9/1966 | Browning | 219/75 |
| 2,806,124 | 9/1957 | Gage | 219/121 |
| 2,859,329 | 11/1958 | Lesnewich | 219/74 |
| 2,862,099 | 11/1958 | Gage | 219/74 |
| 3,027,447 | 3/1962 | Browning et al. | 219/74 |
| 3,214,623 | 10/1965 | Sheer | 219/75 |
| 3,270,179 | 8/1966 | Russell | 219/74 |
| 3,349,215 | 10/1967 | Wagenleitner | 219/74 |

*Primary Examiner*—J. V. Truhe
*Assistant Examiner*—Lawrence A. Rouse
*Attorneys*—Ronald B. Sherer, James C. Simmons and B. Max Klevit

ABSTRACT: Disclosed is a method and apparatus for minimizing the double arcing phenomena often associated with plasma arc torches. The invention is characterized in that by moving the shielding gas rapidly across the face of the torch tip at an angle to the plasma arc, the double arcing phenomena is minimized or eliminated.

PATENTED JAN 5 1971 3,553,422

INVENTOR.
GEORGE H. McCOY

BY James C. Simmons
ATTORNEY

PLASMA ARC WELDING METHOD AND APPARATUS

BACKGROUND OF THE INVENTION

The present invention pertains to preventing or minimizing the effect of double arcing phenomena in a plasma arc torch, and especially for those plasma arc torches designed and operated at currents of 100 amperes or less.

Double arcing is a phenomena associated with operation of plasma arc torches in what is commonly known as the transferred mode. In prior art plasma devices the arc is initiated between an anode and cathode contained in the torch itself. The workpiece being subjected to the welding operation is then made a branch of the welding current, usually the positive branch, and one end of the arc is then transferred from within the torch to the workpiece as the other electrode. It has been found that with prior art torches the path of least resistance for the electrical arc is from the primary electrode (cathode) to the torch tip (initially the anode) and then to the workpiece when either the current is increased so as to overload the plasma column arc carrying capacity or the arc gas flow is insufficient to support the applied current. This results in the double arcing phenomena, e.g. cathode to tip to workpiece. Such double arcing leads to destruction of the torch tip in a short period of time making it necessary to replace the tip and the nozzle and furthermore, leads to inefficient welding.

SUMMARY OF THE INVENTION

It has been discovered that the double arcing phenomena can be minimized and in some cases eliminated by causing the shielding gas to flow rapidly across the tip from which the plasma arc originates at an angle of between parallel to and less than normal to the plasma arc. The method of the present invention is accomplished by providing a nozzle around the torch tip which serves to constrict the flow of arc gas, thereby increasing its velocity and at the same time directing the flow of arc gas across the tip face at the desired angle. The net effect of using the shielding gas in this manner is to increase current carrying capacity of the tip which in turn minimizes the double arcing phenomena.

Therefore, it is the primary object of this invention to provide a method for minimizing double arcing in a plasma arc torch.

It is another object of this invention to provide a torch wherein the double arcing phenomena is minimized or eliminated.

DESCRIPTION OF THE PREFERRED EMBODIMENTS

Figure 1:
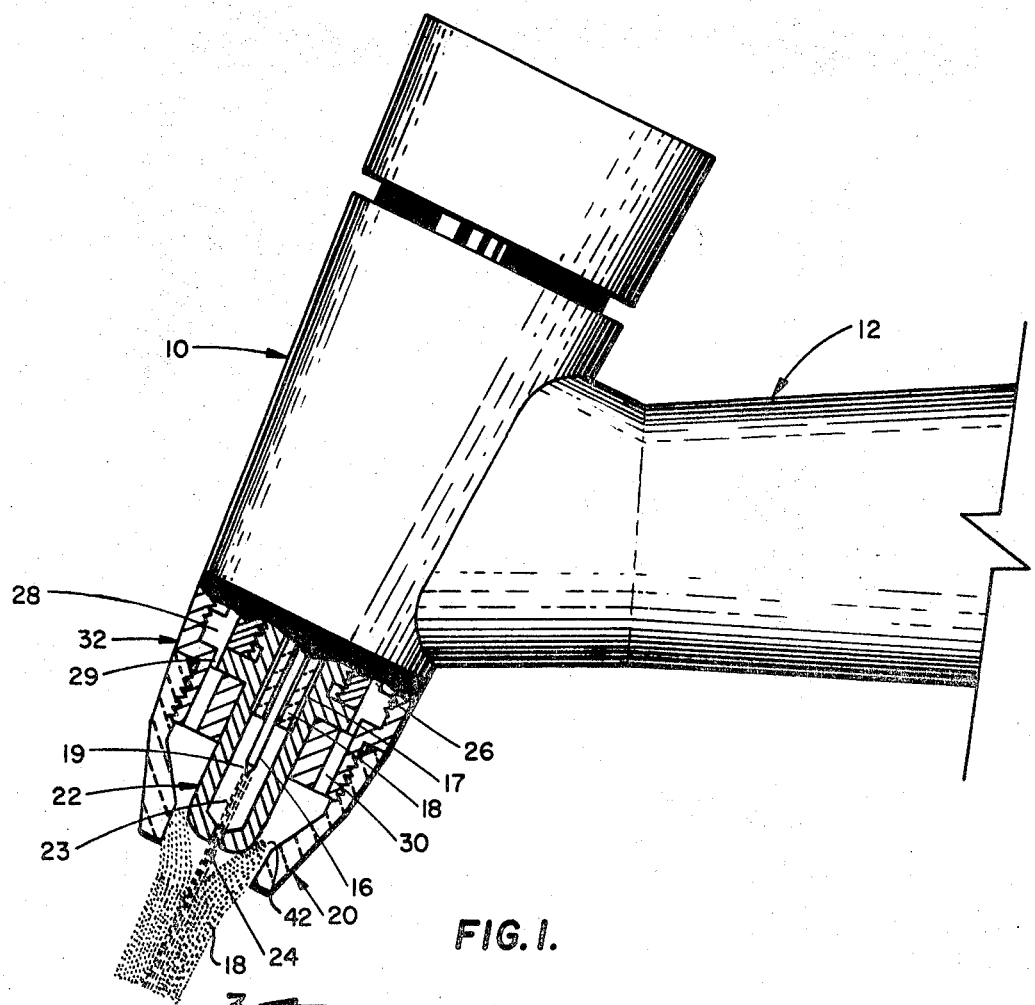
FIG. 1 is a partial cross-sectional view of a welding torch employing the method and apparatus of the instant invention.

Referring now to FIG. 1 there is shown a plasma arc welding torch comprising a head portion designated generally by the numeral 10 and a handle portion designated generally by the numeral 12.

Those portions of the head 10 and handle 12 not shown in section contain means for introducing arc gas to the electrode 16, admitting shielding gas to the nozzle 20, electrically connecting the electrode 16 and the tip 22 to different electrical potentials, and means for cooling the torch as are known to the art. One such torch to which the teaching of the instant invention is applicable is disclosed in Application Ser. No. 831,320, owned by the assignee of the present invention.

Arc gas flows along grooves contained in the outside surface 17 of electrode spacer 18 toward the end 19 of electrode 16. Some of the arc gas then combines with the electric arc to form plasma arc 23. The plasma arc 23 is focused and directed to the work (not shown) by the orifice 24 contained in tip 22 in combination with a sheath of nonionized arc gas flowing between arc 23 and the wall of orifice 24.

Such an arc as described above is inherently stable. However, in order to weld efficiently with the plasma arc it must be shielded with shielding gas 18 such as argon. The shielding gas 18 is introduced via handle 12 to annular passage 26 and then into a larger annular passage 28 through annular passage 29 into a plurality of passages 30 contained in collar 32 disposed around tip 22, and outward of the torch through a passage defined by the tip 22 and nozzle 20. Annular passage 28 is larger in diameter than either passage 26 or passage 29 in order to allow the shielding gas to equalize in pressure around the tip 22 before being directed outwardly of the torch. This passage 28 functions as a surge chamber and therefore smooths the shielding gas flow.

The tip 22 is rounded at the end containing orifice 24 and is fabricated from a metal; the most commonly used material being copper. The tip 22 is connected through the torch handle 12 to a source of electrical potential (not shown) and is usually electrically positive and the electrode 16 is connected through the handle 12 to a source of electrical potential (not shown) usually negative. The electrode 16 is a metal such as tungsten or thoriated tungsten. Under normal operating conditions an electric arc is initiated between tip 22 and electrode 19, a portion of the arc gas is then combined with this electrical arc and the plasma is generated. After establishing the plasma arc, the tip 22 is taken out of the electrical circuit and the workpiece (not shown) becomes the positive terminus of the electric arc. This is known as the transferred mode of operation of the plasma arc torch and the generally used operating mode for welding. After transfer of the positive portion of the electric arc, the electric arc should strike only between the electrode 16 and workpiece (not shown). However, in practice this is not the case and the double arcing phenomena arises wherein the arc would strike from electrode 19 to tip 22 and then to the workpiece (not shown). As stated above this can cause excessive wear on the torch tip.

In prior art torches of this type the tip often projects below the nozzle so that shielding gas contacts the plasma arc along its entire aerial path. Projection of the tip 22, below nozzle 20, can cause an electrical short if the tip is accidentally touched on the workpiece. In addition, contact of the tip to the workpiece can cause contamination of the weld bead.

Figures 2, 3:
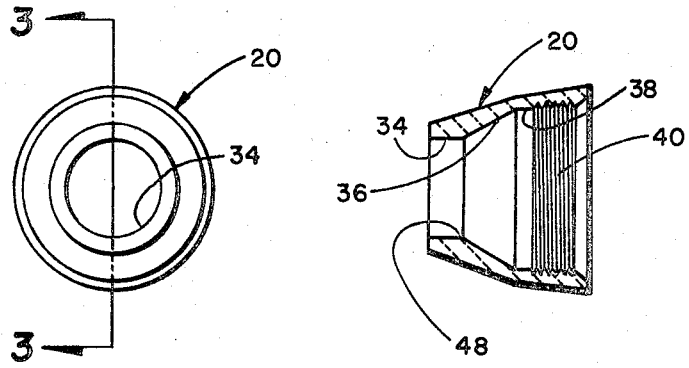
FIG. 2 is an end view of the nozzle according to the present invention.
FIG. 3 is a view taken along line 3–3 of FIG. 2.

Referring to FIG. 1 and as stated above, surrounding a portion of the tip 22 is nozzle 20 for providing the shielding gas 18 around the plasma arc 23. As shown in FIG. 3 the nozzle 20 has a generally cylindrical shaped exit port 34 at its lower end. The cylindrical portion 34 has a longitudinal axis that is coincidental with the longitudinal axis of tip 22 when the nozzle 20 is placed on the torch. The port 34 leads to an upper generally frustoconical internal surface 36 which in turn is connected to another cylindrical surface 38 having threads 40 for being secured to collar 32.

The shoulder 48, of the nozzle defined by the intersection of the cylinder and frustoconical portions, is positioned so that the shoulder 48 in combination with the lower end of the tip 22 causes a constriction in the flow of the shielding gas as shown at 42 in FIG. 1. This constricted flow is then initially directed across the tip face in an angular direction toward the plasma arc 23. The directed angle is greater than parallel to the plasma arc but less than normal to the plasma arc. As the shielding gas passes below the tip it is curved so as to finally surround the plasma arc and flow parallel therewith to the workpiece. As the gas reaches the atmosphere it expands outwardly to give proper shielding with no loss in working distance with the retracted tip.

As shown in FIG. 1, normally the torch when operating in a transferred mode has an electrical arc maintained directly from electrode 19 at its lower end to the workpiece not shown. With a normal nozzle (e.g. one that does not have the sharp shoulder but rather is a smooth tapered cone from top to bottom) the arc often would strike from electrode 23 to tip 22 and then to the workpiece.

As stated before, the undesirable effects of the double arcing phenomena are prevented by causing the shielding gas to rapidly move across the face of the tip of the torch. It is not understood exactly how this works but is does minimize and in some cases prevent the double arcing as commonly found in the lower current plasma arc torches. It has been found that an included angle of approximately 70° for the frustoconical surface 36 of the nozzle 20 is desired for a tip having a rounded configuration as shown in the drawing. However, the angle is only deemed critical when designed for the particular configuration of nozzle shown and it must be appreciated that the shape serves only to cause constriction and direction of the shielding gas to prevent double arcing. Therefore, for a different tip shape the nozzle configuration must also be changed in order to achieve the desired movement of shielding gas.

The nozzle is preferably manufactured from a nonelectrical conducting material such as alumina. However, other materials can be used depending upon the working environment of the torch.

Because the tip is recessed within the nozzle, it cannot accidentally strike the workpiece and cause a short circuit. The retracted tip also minimizes copper inclusions in the weld metal.

Having thus described my invention by what is considered a preferred embodiment, I wish it understood that it may be embodied in other forms without departing from the scope of the appended claims.

I claim:

1. In a plasma arc welding torch of the type comprising a handle, a torch head secured to the handle, a pair of electrodes including a cathode and a tip serving as an anode disposed within the head for initiating an arc, means for supplying arc gas through the tip to the electric arc for creating an arc plasma and means for introducing shielding gas to the torch to be directed at the arc, the improvement which comprises; a nozzle containing a central passage, the nozzle secured to the torch head and surrounding at least the lower portion of the torch tip, the tip having a rounded configuration at the gas discharge end, the central passage in the nozzle being spaced apart from the tip and defining a conduit for shielding gas to flow around the tip, means on the surface of the central passage to constrict and direct the shielding gas across the end of the tip toward the plasma arc at an angle greater than parallel to but less than normal to the plasma arc.

2. A torch according to claim 1 wherein there is provided a collar disposed around the tip defining a shielding gas surge chamber communicating with the means for supplying the shielding gas and spaced above the point where the plasma arc leaves the tip.

3. A plasma arc torch according to claim 2 wherein the end of the nozzle through which the plasma arc and shielding gas are directed has an internal configuration comprising an upper frustoconical surface leading to a cylindrical surface at the discharge end of the nozzle, the cylindrical discharge opening surrounding the lower end of the tip, the space defined by the frustoconical surface and the rounded end of the tip serving to constrict and direct the shielding gas toward the plasma arc.